(12) United States Patent
Shuster et al.

(10) Patent No.: US 9,123,157 B2
(45) Date of Patent: *Sep. 1, 2015

(54) MULTI-INSTANCE, MULTI-USER VIRTUAL REALITY SPACES

(71) Applicants: Brian Mark Shuster, Vancouver (CA); Gary Stephen Shuster, Fresno, CA (US)

(72) Inventors: Brian Mark Shuster, Vancouver (CA); Gary Stephen Shuster, Fresno, CA (US)

(73) Assignees: Brian Mark Shuster, Vancouver (CA); Gary Stephen Shuster, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/461,336

(22) Filed: Aug. 15, 2014

(65) Prior Publication Data

US 2014/0354638 A1    Dec. 4, 2014

Related U.S. Application Data

(63) Continuation of application No. 14/083,323, filed on Nov. 18, 2013, now Pat. No. 8,812,954, which is a (Continued)

(51) Int. Cl.
*G06F 3/0481* (2013.01)
*A63F 13/12* (2006.01)
(Continued)

(52) U.S. Cl.
CPC ............... *G06T 19/006* (2013.01); *A63F 13/12* (2013.01); *G06T 13/40* (2013.01); *G06T 15/08* (2013.01);
(Continued)

(58) Field of Classification Search
CPC ......... A63F 13/12; A63F 13/10; H04L 29/06; G05B 2219/23377; G06Q 10/10; G06F 3/0481; G06F 9/44543; G06F 3/04817; G06F 3/04815; G06F 3/00; G06F 3/048; G06T 19/00; G06T 17/20; G06T 13/40; A63B 71/06
USPC ......... 715/706, 733, 737, 764, 765, 835, 836, 715/839, 970.1, 976, 977; 345/419, 420, 345/473, 949, 957; 463/1, 31, 32, 40, 42; 340/323 R
See application file for complete search history.

(56) References Cited

U.S. PATENT DOCUMENTS 6,166,732 A     12/2000   Mitchell et al.
6,215,498 B1    4/2001    Filo et al.
(Continued)

OTHER PUBLICATIONS

International Search Report and Written Opinion, International Application No. PCT/US2008/56150, International Filing Date Mar. 7, 2008.

*Primary Examiner* — Xiomar L Bautista
(74) *Attorney, Agent, or Firm* — Coleman & Horowitt, LLP; Sherrie M. Flynn (57) ABSTRACT

A multi-instance, multi-user animation platform includes a plurality of modeled parallel dimensions in a computer memory. Each of the parallel dimensions may be an independent model of a physical, three-dimensional space having corresponding features such that the parallel dimensions are recognizable as counterparts to each other. Avatars are located within corresponding ones of the parallel dimensions so as to prevent over-population of any one of the parallel dimensions by avatars. Avatars are animated within different ones of the parallel dimensions using input from respective users to provide virtual-reality data. A common space is modeled in the computer memory configured in relation to the plurality of parallel instances so that an object located inside the common space is visible from viewpoints located inside each of the plurality of parallel instances. Remote clients may output an animated display of a corresponding one of the parallel dimensions and avatars therein.

26 Claims, 7 Drawing Sheets

Related U.S. Application Data continuation of application No. 13/625,804, filed on Sep. 24, 2012, now Pat. No. 8,589,792, which is a continuation of application No. 12/554,744, filed on Sep. 4, 2009, now Pat. No. 8,276,071, which is a continuation of application No. PCT/US2008/056150, filed on Mar. 7, 2008.

(60) Provisional application No. 60/893,531, filed on Mar. 7, 2007.

(51) Int. Cl.
    *G06T 19/00*     (2011.01)
    *A63F 13/30*     (2014.01)
    *G06T 13/40*     (2011.01)
    *G06T 17/00*     (2006.01)
    *G06T 15/08*     (2011.01)

(52) U.S. Cl.
    CPC ........... G06T 17/00 (2013.01); *A63F 2300/407* (2013.01); *A63F 2300/5533* (2013.01); *A63F 2300/5553* (2013.01); *A63F 2300/8082* (2013.01); *G06T 2200/04* (2013.01); *G06T 2219/024* (2013.01)

(56) References Cited

U.S. PATENT DOCUMENTS

| | | |
|---|---|---|
| 6,219,045 B1 | 4/2001 | Leahy et al. |
| 6,381,444 B1 | 4/2002 | Aggarwal et al. |
| 6,401,122 B1 | 6/2002 | Matsui et al. |
| 6,476,830 B1 | 11/2002 | Farmer et al. |
| 6,561,811 B2 | 5/2003 | Rapoza et al. |
| 6,561,906 B2 | 5/2003 | Suzuki |
| 6,767,287 B1 | 7/2004 | Mcquaid et al. |
| 6,772,195 B1 | 8/2004 | Hatlelid et al. |
| 7,958,453 B1 | 6/2011 | Taing |
| 8,026,918 B1 | 9/2011 | Murphy |
| 2001/0051989 A1 | 12/2001 | Moncreiff |
| 2002/0062348 A1 | 5/2002 | Maehiro |
| 2003/0039945 A1 | 2/2003 | Dang et al. |
| 2003/0083922 A1 | 5/2003 | Reed |
| 2003/0139938 A1 | 7/2003 | Meyers |
| 2003/0151605 A1 | 8/2003 | Dominici |
| 2004/0015549 A1 | 1/2004 | Saruhashi et al. |
| 2004/0030781 A1 | 2/2004 | Etesse et al. |
| 2004/0235564 A1 | 11/2004 | Booth |
| 2005/0026692 A1 | 2/2005 | Dyl |
| 2005/0044005 A1 | 2/2005 | Giannini |
| 2005/0216853 A1 | 9/2005 | Matsuda |
| 2006/0089873 A1 | 4/2006 | Stewart et al. |
| 2006/0119598 A1 | 6/2006 | Littlefield |
| 2006/0287072 A1 | 12/2006 | Walker et al. |
| 2007/0011273 A1 | 1/2007 | Greenstein et al. |
| 2007/0038559 A1 | 2/2007 | Jung et al. |
| 2007/0130339 A1 | 6/2007 | Alcorn et al. |
| 2007/0146360 A1 | 6/2007 | Clatworthy et al. |
| 2007/0162547 A1 | 7/2007 | Ross |
| 2007/0202484 A1 | 8/2007 | Toombs et al. |
| 2007/0220090 A1 | 9/2007 | Hall |
| 2007/0224585 A1 | 9/2007 | Gerteis et al. |
| 2007/0249323 A1 | 10/2007 | Lee et al. |
| 2007/0255805 A1 | 11/2007 | Beams et al. |
| 2008/0064018 A1 | 3/2008 | Griffin |
| 2008/0081701 A1 | 4/2008 | Shuster |
| 2008/0134056 A1 | 6/2008 | Shuster |
| 2008/0158232 A1 | 7/2008 | Shuster |

MULTI-INSTANCE, MULTI-USER VIRTUAL REALITY SPACES

CROSS-REFERENCE TO RELATED APPLICATION

This application is a continuation of U.S. application Ser. No. 14/083,323, filed Nov. 18, 2013, now U.S. Pat. No. 8,812,954, which is a continuation of U.S. application Ser. No. 13/625,804, filed Sep. 24, 2012, now U.S. Pat. No. 8,589,792, which is a continuation of Ser. No. 12/554,744 filed Sep. 4, 2009, now U.S. Pat. No. 8,276,071, which is a continuation of PCT Application No. US2008/056150, filed Mar. 7, 2008, which claims priority to U.S. provisional application Ser. No. 60/893,531, filed Mar. 7, 2007, which applications are specifically incorporated herein, in their entirety, by reference.

BACKGROUND

1. Field of the Inventions

The present invention relates to virtual computer-generated environments in which participants are represented by computer-generated avatars, and in particular for environments that simulate an actual 3-D environment and allow for simultaneous participation of multiple players.

2. Description of Related Art

Computer generated virtual environments are increasingly popular methods for people, both real and automated, to interact within a networked system. The creation of virtualized worlds, three dimensional or otherwise, is well known. Simple text based adventures such as "Zork", early "first person shooter" games such as "Doom", and ultimately numerous highly complex environments such as "Halo" are well known in the art. Various on-line environments are known in which a 3-D physical world (actual or fantasy) is simulated. Environments of this type are sometimes referred to as "virtual reality" or "virtual reality universe" (VRU) environments. In known VRU environments, an actual or fantasy universe is simulated within a computer memory. Multiple players may participate in the environment through a computer network, such as a local area network or a wide area network. Each player selects an "avatar," which may comprise a three-dimensional figure of a man, woman, or other being, to represent them in the VRU environment. Players send inputs to a VRU engine to move their avatars around the VRU environment, and are able to cause interaction between their avatars and objects in the VRU. For example, a player's avatar may interact with an automated entity or person, simulated static objects, or avatars operated by other players.

With the ubiquity of computer networking, engineers and designers included the ability for players within these virtual environments to interact. One drawback of the VRU is that, as in the actual world, space is limited by environmental constraints. In addition, limitations on computer processing speed, network bandwidth, and other factors also limit the number of participants and the richness of environment. Accordingly, prior art VRU environments may limit the number of simultaneous players and their methods of interactions for various reasons, including to avoid exceeding the programming, networking, and hardware limitations of the servers and/or clients.

Such limitations may be present in "massively multiplayer" environments, such as "Everquest" or "Second Life", which are built specifically on the concept of mimicking real world environments, including the natural capacity of real world environments to hold numerous simultaneous inhabitants. Such limitations may be implemented in a less than desirable manner because they limit the ability of the VRU to accommodate the wishes of its clients. However, such limitations are provided for various reasons, including because (a) server capacity is incapable of simultaneously handling the number of users desired or (b) client capacity, for each user, is insufficient to process and display the data needed for such user's computer to appropriately and adequately render avatars or other representations of the other users, and otherwise construct a complete and accurate representation of the environment; or (c) independent of hardware or software capacity considerations, limitations imposed by geometric constraints of the simulated environment, or simply put, lack of simulated space.

Mechanisms to address server capacity and client capacity issues, while flawed, exist in the art. Such mechanisms may include automatically moving avatars from one portion of the environment to another (with or without the player's consent), barring additional avatars from entering an environment once a defined capacity is reached, limiting the ability of inhabitants of the environment to interact with each other and the environment, and having servers operate completely (or partially) independently.

For example, one problem in implementing a VRU arises from its presentation of content in a virtual approximation of real, three-dimensional space. As a result, there is a limit on how much modeled space can be occupied at the same time. When using the HTTP application layer or other conventional internet modalities, the number of users able to participate on a web site simultaneously is limited only by the computing power and network bandwidth available to the site hosting the page. In contrast, a VRU mimics the three-dimensional space found within the physical world and therefore the space limitations found in the real world also are experienced within the VRU. These include such limitations as the inability to realistically depict multiple users in the same place, the inability of users to walk through the same doorway simultaneously, the inability to exceed occupancy limitations, and similar real world space limitations. Because VRU users are visible to other users, they occupy space, a portion of the visual field, or both.

The problem may be further demonstrated with the example of a nightclub within a VRU. The nightclub would be represented as a fixed area of space within the VRU. While the VRU could in theory have a nightclub of enormous dimensions, there would be areas within the nightclub, such as proximate to a stage or proximate to celebrities present therein, which would be very desirable areas to inhabit. As a result, whether the area at issue is described as the full nightclub or the more desirable areas therein, some or the entire nightclub may have less space available for occupancy than there are people who desire to have their avatars occupy it. While the same solutions exist in a VRU as exist in the real world for increasing occupancy capacity (i.e. making the facility bigger, packing more people in with less space available to reach, etc.), the very limitations found in those real world solutions would apply in a VRU.

A second problem common to VRU's is that they depend on their various users' computers to render the environments that are presented within the VRU. Thus, there are limitations on how many avatars, objects, textures and other features can be rendered and animated for each user. Again utilizing the example of a nightclub, if the dimensions of the nightclub were drawn so that 10,000 avatars could simultaneously be accommodated, seen, and interacted with, each user computer would be tasked with tracking, rendering and animating each of 10,000 autonomously controlled avatars. Similarly, avatars within the same space, when permitted to communicate with each other, whether via chat, voice over IP, or otherwise, may generate too much content to permit effective communication.

It is desirable, therefore, to resolve these problems and to provide access for greater numbers of avatars within a VRU space while minimizing undesired experiences for VRU participants, and providing new, more varied and interesting opportunities and experiences for users within the VRU space.

SUMMARY

The instant inventions disclose a method, system and apparatus for dynamically establishing and managing multiple instances of a space within a VRU. Such multiple instances may be referred to herein as "dimensions." The inventions allow for the creation of an unlimited number of duplicate instances of a space in a VRU, which instances are created dynamically, and which instances users can interact across. Furthermore, the inventions permit such dimensions to be utilized in a manner that does little or nothing to impair the ability of the VRU to emulate those portions of the real world environment that may be crucial to a positive user experience within a VRU.

In an embodiment of the inventions, once the occupancy capacity of an area has been met, another attempt to access the area by an additional avatar may trigger creation of a new instance, or dimension, of the area. The new area may then be populated with avatars subsequently seeking to enter that area of the VRU environment. The term "new dimension" or "duplicate dimension" encompasses a virtual space such as may be provided by duplication of certain portions of the content within an area, such as, for example, walls and other simulated structural elements, a stage and all participants thereon, or other elements. This may be accomplished, in the alternative by making the elements which are not desired to be duplicated (i.e. avatars) invisible and inaccessible to other, similarly non-duplicated elements (i.e. other avatars).

Further attempts to access the area may populate the new dimension until such time as the new dimension reaches its occupancy capacity, at which time an additional new dimension would be generated and the cycle repeated.

It is to be understood that in other embodiments, other algorithms for populating dimensions may be used. Such algorithms may include, for example, adding new avatars to the least populated dimension. Thus, if one or more avatars have left the first dimension after the creation and population of a second dimension, new users might be preferentially placed in the first dimension before the second dimension reaches its occupancy capacity. For further example, avatars may be added approximately evenly across several dimensions all of which are below their occupancy capacity, and/or avatars may be placed in one of duplicate dimensions based on the users' status, achievements or other classifications. Users may also create their own duplicate dimension with limited enrollment or purposes. These may include and/or permit, without limitation, (a) themselves; (b) a private party; (c) members of a group; (d) the public at large; (e) paid attendees; and/or (f) specified invitees.

In embodiments, avatars may be distributed to a new dimension from one or more crowded dimensions. Crowding may be determined by various measures. For example, an optimal or "full" level of population for a particular dimension may be determined. Avatars may be allowed to continue to populate such dimensions in excess of their optimal capacity. New dimensions may be formed by transporting avatars from one or more of the dimensions into a new dimension when a trigger event occurs. Trigger events may include, for example, one or more dimensions exceeding their optimal occupancy capacity by some amount or percentage; and/or when the overall number of users in all relevant dimensions would warrant the creation of a new dimension, when at least one of those dimensions exceeds its optimal occupancy capacity. Thus, for example, if Dimension A exceeds its optimal capacity by 30% and Dimension B exceeds its optimal capacity by 30%, Dimension C is created and some users from Dimension A and Dimension B are imported into Dimension C. In the alternative, a trigger event may occur at some level less than the optimal or full occupancy level, for example, to leave room for preferred users of a particular dimension.

Two or more dimensions may be combined to form a larger dimension containing all the participants of the former dimensions. Likewise one or more dimensions may be split up into a number of smaller dimensions, with avatars assigned to dimensions based on random selection, user preferences, user profiles, and/or other criteria. Various triggers may be used to determine when a dimension should be combined or split up, such as, for example, the population of the dimension falling above or below a defined threshold.

In other embodiments, avatars may populate dimensions based on user generated preferences. Thus, for example, a Spanish speaking user may prefer to populate a dimension shared by other Spanish speaking users, even if such a dimension has, for example, fewer avatars than other available dimensions which are populated predominantly of speakers of other languages. Similarly, users from language groups that are more easily translated in a mechanical manner into the other users' languages may be treated as a single group. Thus, for example, if Spanish and French are more easily translated between than are Spanish and Chinese, the Spanish and French users may be grouped together in a dimension having a translation function.

In other embodiments, avatars may populate dimensions based on preferences deduced from the user's supplied information or information otherwise obtained about the user. Thus, for example, a user may prefer to populate a dimension shared by users that appear on his list of friends, even if such a dimension has, for example, fewer avatars than other available dimensions which are populated predominantly by users who do not appear on their list of friends. Similarly, a user may wish to avoid dimensions which are populated by users on their list of ignored users. Algorithms that incorporate users' information including their friends, friends of friends, ignored users; as well as users who belong to groups or groups with similar interests to groups that the user is involved with are all examples of preferences that could be used to deduce a preferential dimension for a user to join.

Users may be given the opportunity to travel between dimensions, optionally subject to defined limits or conditions. Thus if a user is directed to populate a certain dimension, yet they would prefer to populate a different dimension, the user may select to have their avatar change dimensions to the desired dimension. Users may transport themselves to the desired dimension unless restricted from doing so by factors including but not limited to: that the desired dimension is restricted; that the desired dimension is private; and/or that the desired dimension is at or above its relevant occupancy capacity. Transport to different dimensions may be accomplished, for example, by clicking on the name of or a link relating to a user, an avatar or an object, or by manipulating an avatar so that enters a portal which may lead, either directly or through one or more additional portals, to a corresponding space in a different dimension. The avatar may then be transported to the dimension where the user, avatar, or object resides. In the alternative, or in addition, a VRU space may include "locked dimensions," that do not permit travel to and/or from the dimension, or that impose other restrictions not generally imposed on other dimensions in the VRU space.

Different dimensions may be related to one another and to interact or influence one another in defined ways. For example, users may also be permitted to observe other dimensions without being visible and/or able to interact with those dimensions at all. This may be useful, for example, prior to travel to such dimension, or if a user is merely interested in observing interactions of others. Users may be permitted to obtain information about what dimensions other users are in, such as users who are marked on the user's friends list or ignored users list.

Users may be given the option to chat between dimensions; i.e., with users populating other dimensions. Such chat may include private chat; public chat; or group chat or any other channel of chat that the user may desire. Thus, public chat may, for example, aggregate chat from more than one dimension. In the alternative, or in addition, the public chat may not aggregate more than one dimension, but individual users may wish to monitor or participate in public chat (or any other channel of chat) from dimensions other than the one in which their avatar presently populates.

In an embodiment of the inventions, a defined area or portion of multiple dimensions may be visible to, and/or interact with, other parts or members of the dimensions. For example, a stage area may be defined that is visible and audible in multiple dimensions surrounding the stage area. Access to such a stage or common area may be limited in any desired way. Actions on the stage may affect multiple dimensions. For example, if a robot avatar or normal avatar throws an object out of a stage area into a surrounding nightclub, as the object passes a boundary between the stage area and the multi-dimensional nightclub floor, the thrown object may be replicated and appear in each of the surrounding dimensions.

Likewise, the surrounding multi-dimensional areas may influence a common area. Continuing the nightclub example, a performer on a common stage may receive audience feedback from multiple surrounding dimensions. For further example, a storefront may comprise a common area in which an avatar for a sales clerk may reside. The clerk may service avatar customers from multiple dimensions, with priority of service determined in different ways. For example, customers in different dimensions may summon the clerk, which may be depicted as "busy" (for example, depicted as interacting with another avatar) at times when the clerk is occupied with servicing a customer in another dimension. The waiting customer may be given a message with an estimated wait time, or an offer to make an appointment with the clerk. If multiple customers are waiting, they may be queued and serviced in any order desired by the clerk. For example, repeat customers may be serviced first.

In both of the foregoing examples, the performer and the clerk provide examples of an object—e.g., an avatar—that has a multi-instance presence in more than one dimension. In an embodiment of the invention, the presence in multiple dimensions may be asynchronous. In other words, each instance of the object in multiple dimensions may be generated asynchronously, depending on input from each dimension. In the alternative, the object may be generated synchronously, meaning as a single instance using the same input for each dimension.

A more complete understanding of the method and system for managing multiple dimensions in a VRU space will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF VARIOUS EMBODIMENTS

Figure 1:
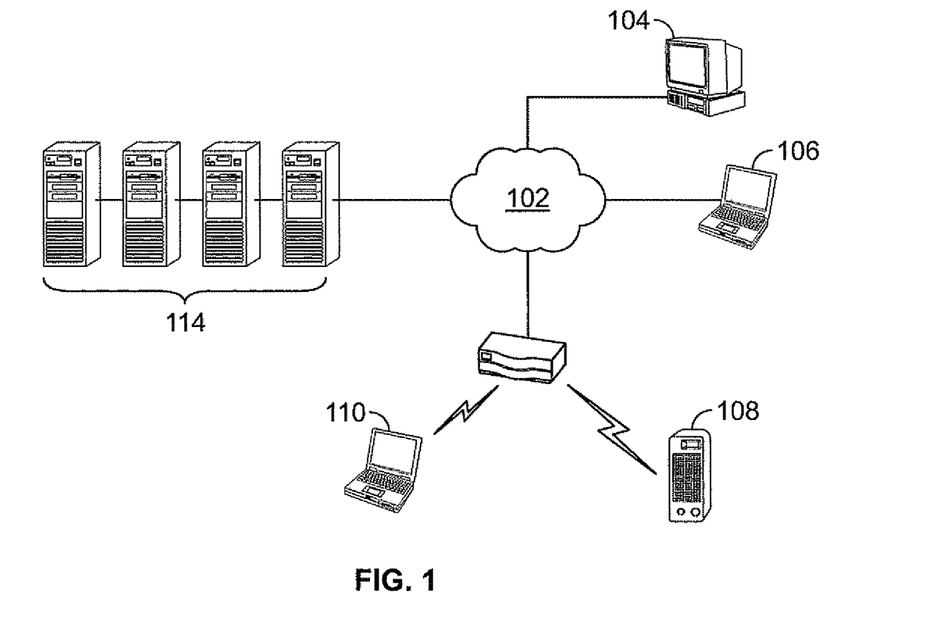
FIG. 1 is a schematic diagram showing a system according to the inventions.

Referring to FIG. 1, a system 100 for providing a VRU to multiple users may comprise a plurality of client sites, nodes or terminals, for example a personal computer 104, portable computers 106, 110, a compact player, cell phone or digital assistant 108, and/or router 112 communicating via a WAN 102 to one or more servers 114. Servers 114 store and serve VRU data and software to the client sites. Software or firmware may also be located at each client site, configured to work cooperatively with software or firmware operating on servers 114. Generally, any number of users may be communicating with servers 114 for participation in the VRU at any given time.

Figure 2:
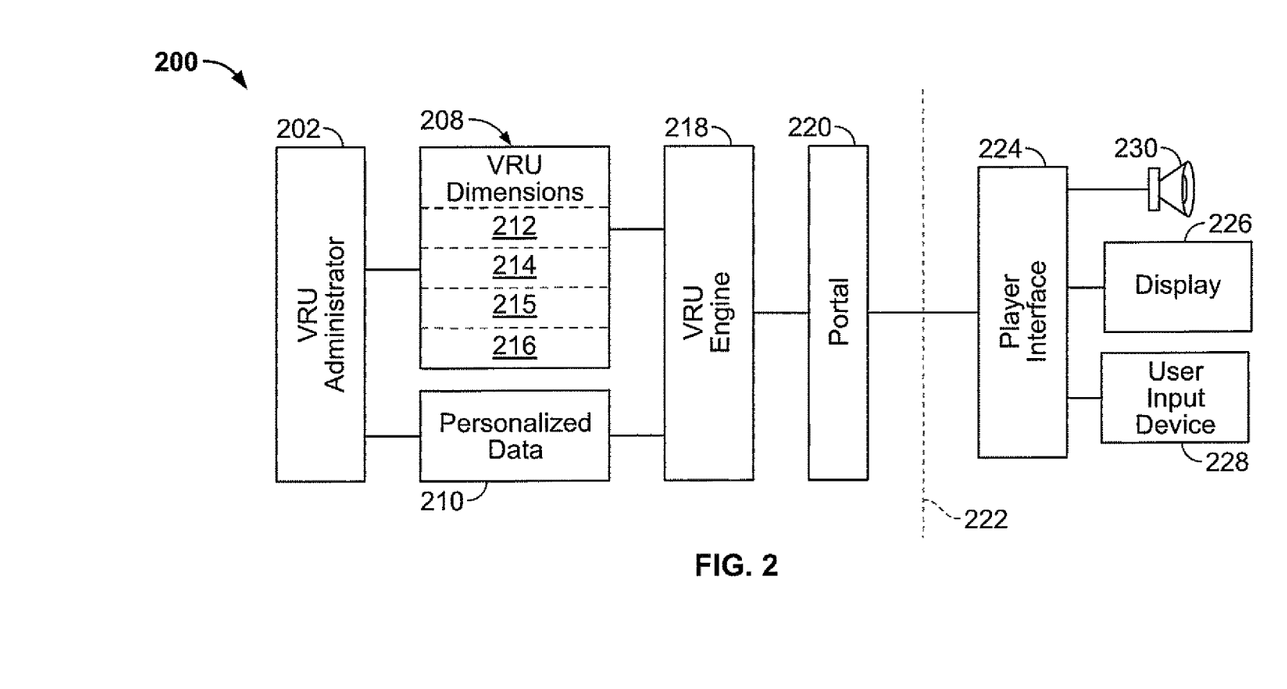
FIG. 2 is a schematic diagram showing a system according to the inventions.

Referring to FIG. 2, a system 200 for providing a VRU according to the invention may be considered to be comprised of server-side components (to the left of dashed line 222) and client-side components (to the right of dashed line 222). Server-side components may comprise a portal 220 for managing connections to multiple simultaneous players. Portal 220 may interact with a VRU engine 218, passing user input from multiple clients to a VRU engine, and passing data from the VRU engine to respective individual players. VRU engine 218 may be operatively associated with various memory spaces, including dimensional spaces 208 holding two or more parallel dimensions 212, 214, 215 and 216, and a personalized or common data space 210. As known in the art, objects in a VRU are modeled as three-dimensional objects, or two-dimensional objects, having a defined location, orientation, surface, surface texture, and other properties for graphic rendering or game behavior. Dimensional memory space 208 may hold active or inactive instances of defined spaces used in the VRU environment. For example, the environment of a popular simulated nightclub may be replicated in different spaces. Personalized space 210 may be comprised of various different personal areas each assigned to a different user, for example, avatar or avatar accessories data. The VRU engine may operate with other memory areas not shown in FIG. 2, for example various data libraries, archives, and records not inconsistent with the methods and systems disclosed herein.

In an embodiment of the invention, each user may customize an avatar to have an appearance and qualities specified by the user, by choosing avatar characters, features, clothing and/or accessories from an online catalog or store. The particular arrangement selected by a user may reside in a personalized space 210 associate with a particular user, specifying which avatar elements are to be drawn from a common space to construct an avatar. In an embodiment of the invention, a customized avatar instance may be stored in a personalized space for the user. In the alternative, or in addition, a user may own customized elements of an avatar, including clothing, accessories, simulated physical powers, etc., that are stored solely in the personalized space and are not available to other users. Avatars may move and interact both with common elements and personalized elements.

A separate administration module 202 may operate at the server level to create, update, modify or otherwise control the content of the VRU as defined in the memory areas 204 and 210. Generally, changes in the personal space area 210 are driven by individual users, either through the VRU administrator 202 or another module. Control of common areas, i.e., the game environment and the objects in it, including any multi-dimensional areas, may be via the administrator module 202.

At the client level, a player interface module 224 may be installed to receive player inputs from one or more user input devices 228, such as a keyboard, mouse or other pointer, or microphone, and provide data to the VRU engine 218 via portal 222 in response to the input. The player interface module may also receive game data from portal 220 and process the data for display on display 226 and/or for audio output on speaker 230. Various systems and methods for providing a three-dimensional, multiplayer interactive animation to multiple players are known in the art, or may be adapted by one of ordinary skill for use with the invention. For example, rendering of a scene may be performed at the client or server level. Generally, it may be advantageous to perform calculations and graphics operations, to the extent possible, at the client level, thereby freeing up network bandwidth and minimizing loads on the server. The invention is not limited to a particular hardware or software architecture for carrying out the steps described herein.

Figure 3:
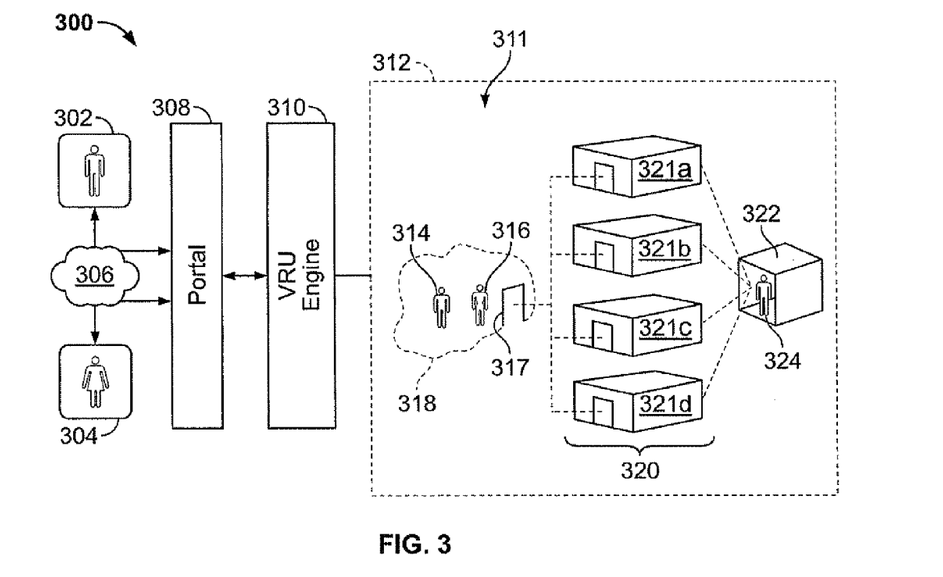
FIG. 3 is a schematic diagram showing aspects of a system with multiple dimensions according to the inventions.

FIG. 3 shows in schematic fashion a system 300 for providing a multi-user, multi-dimensional animation. System 300 comprises a portal or interface 308 connected to receive data, such as through a wide area network 306, from a plurality of users 302, 304 (two of many shown). Users 302, 304 may operate a client computer having a web browser or application configured to communicate animation commands to VRU engine 310 via interface 308. VRU engine 310 may model a virtual three-dimensional environment 311 within a computer memory 312. A first user 302 may provide commands via portal 308 to VRU engine 310 used to control the operation of a first avatar 314. Likewise, a second user 304 may control a second avatar 316.

Environment 311 may include multiple scenes or regions modeled to simulate a region of space, for example, the surface of a planet or region thereof, the inside of a room or building, the surface of an island, and so forth. It should be appreciate that FIG. 3 presents a highly simplified schematic view of a modeled environment. An actual modeled environment may be highly complex, including thousands of different modeled spaces, some or all of which may exist in more than one dimension. Modeled scenes or spaces may be of different types, meaning they may be modeled according to different rules. They are connected in that transportation between spaces is allowed, at least for some avatars in the environment 311.

The environment 311 may allow for the passage of avatars between scenes via simulated portals or transportation elements, for example, simulated doorways, teleportation terminals, roads, cars, trains, etc. By entering a portal or transportation element, an avatar may leave a first scene and be delivered to a second scene being simulated in the memory 312. One of the tasks of the VRU engine may be to keep track of the various portals and transportation elements between scenes, operating these elements when requested by users, and adding or deleting portals as scenes are added or deleted. Generally, portals should act in a stable, predictable manner so that a user may navigate his or her avatar through the simulated environment 311 to accomplish the user's objectives. For example, a simulated doorway at the simulated 100 East Main Street address of the simulated public road system in Computerville should always lead to the registered tenant at that address, be that a private residence or business. For further example, some transportation elements, for example teleportation portals or subways, may lead to different destinations. However, in this case the transportation element should be configured to allow the user to control the destination of the user's avatar, if so desired.

VRU engine 310 may operate such that some scenes in environment 311 may be capable of being replicated to create another instance of the scene, for example multi-dimensional spaces 320, while other scenes cannot be replicated, for example a non-replicable or mono-dimensional space 318. Thus, environment 311 may contain both types of spaces, as well as portals or transportation elements allowing avatars to transport between multi-dimensional and mono-dimensional spaces. Avatars 314, 316 present in mono-dimensional space 318 may be transported via portal 317 to any one of the multi-dimensional spaces 320. Conversely, avatars in the multi-dimensional spaces 320 may pass into space 318 via portal 317, which may be replicated as an instance in each multi-dimensional space 321a-d. Multi-dimensional spaces 320 may originate as a single mono-dimensional, bounded modeled space. If the space becomes overly crowded, it may be replicated in any number of instances to provide room for growth in the population of avatars. However, the replicated space is not merely a copy, but rather exists as a connected part of the same environment 311. For example, space 321d may be a popular virtual nightclub originally existing in a single instance. As the popularity of the club grows, it may be desirable, for example, to replicate the nightclub experience for new customers. Hence, each dimension 321b, c and d may be created in response to population threshold of the existing club's instances being exceeded. Each additional dimension may allow for two-way travel through a portal 317 to a common area, or through any number of alternative portals.

The additional dimensions 321b-d may therefore provide the advantages of accommodating any number of users without requiring users to subscribe to a new game or environment 311. The most popular and successful destination in the environment 311 may therefore be enjoyed by more users, almost without limit. User's are therefore not required to exit a particular game or environment to enjoy these popular attractions. Likewise, users need not be cut off from communicating with or otherwise interacting with any other users participating in the multi-user environment 311 while still being able to freely access the most crowded destinations within the environment.

The existence of multiple dimensions 320 may be revealed or hidden from some of all users 302, 304. In an embodiment of the invention, some or all users may enter into one or a series of multi-dimensional spaces without being aware of the existence of other dimensions. In the alternative, users may be given an indication that their avatars have entered or are entering a space for which multiple instances exist. Both alternatives may co-exist within the same environment 311, depending on the identity of the user and desired characteristics of a multi-dimensional space.

Environment 311 may further comprise one or more common spaces 322 that provide for simultaneous interaction with multiple instances of parallel dimensions 320. For example, a common space may comprise a stage to a club or theater. The interior of the common space may be visible and/or audible in each of the dimensions 321a-d. An avatar or other object in the common space 322 may be able to pass into each of the parallel spaces, being replicated in the process. Certain objects or avatars may also be able to pass from the parallel dimensions 320 into the common area. For example, avatars may queue up inside of different parallel dimensions and be granted access to the common area 322 in sequence. For further example, some avatars may be granted special rights or powers that permit them to enter a common space 322 that permits simultaneous interaction with multiple dimensions. Various other exemplary interactions between common spaces and parallel dimensions will be described in the detailed description below.

FIG. 3 may also serve to illustrate an alternative embodiment in which users are segregated into independent, isolated groups that simultaneously share a simulated space or facility. In this embodiment, the dimensions 321a-d may represent isolated groups of avatars and interactive objects. Such groups may be contained within a non-interactive common environment, such as the walls, ceilings and floors of a simulated nightclub or other space. The non-interactive common environment may serve as common backdrop that is shared by the different groups 321a-d, which need not be aware of one another's existence. This embodiment serves to illustrate that the experience of multiple parallel dimensions may be implemented in various ways, without departing from the spirit and scope of the inventions.

Figure 4:
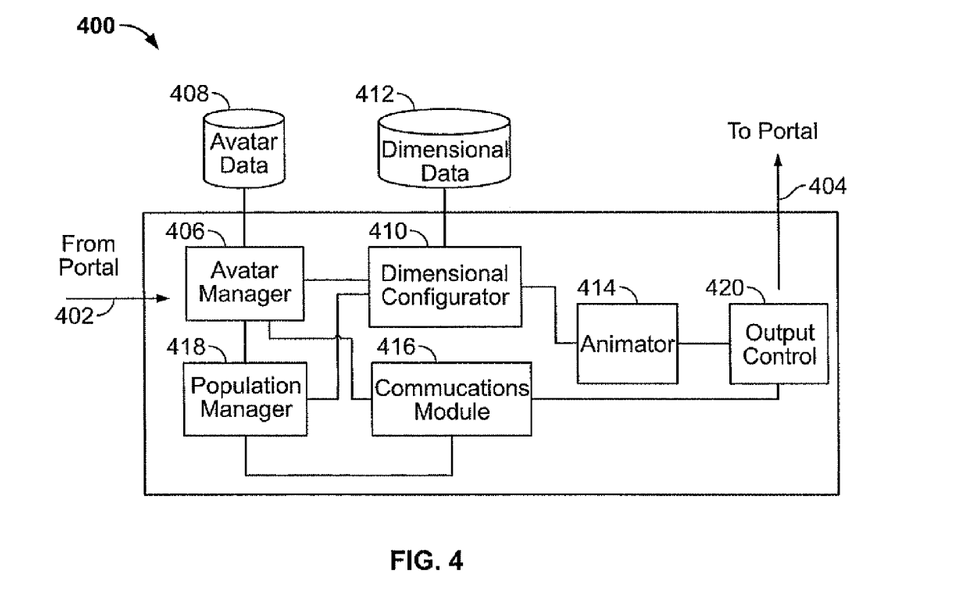
FIG. 4 is a block diagram showing aspects of a system for handling multiple dimensions according to the inventions.

FIG. 4 is a block diagram showing exemplary aspects of a multi-dimensional system 400. System 400 may be implemented, for example, by a server or group of servers operating at a network-accessible site. Input data 402, including for example user commands or data used to direct the motion of avatars and other objects, may be provided to system 400 via a portal. Output data 404, including for example virtual-reality data configured to cause remote clients to output an animated display of a corresponding one of the parallel dimensions and avatars therein, may be output to a portal module for distribution to remote clients.

System 400 may comprise an avatar manager component 406 operably connected to a database 408 of avatar data. Like other components of system 400, the avatar manager component 406 may be implemented in any suitable software, hardware, or combination thereof. The avatar manager may process incoming user command and associate commands with corresponding avatar and other object data. For example, the avatar manager may ensure that each avatar is configured according to user commands with clothing, accessories, or gear available to its corresponding user. The avatar manager may communicate with a dimensional configurator 410 and population manager 418 to ensure that each avatar is placed correctly in one of parallel dimensions managed by the configurator and population manager. The avatar manager may further communicate with an animation component 414 to ensure that each avatar is positioned and moved in accordance with user commands. In addition, the avatar manager may cooperate with a communications component that operates to allow communication, for example text or audio chat, between different users.

A population manager 418 may monitor the population density of avatars in defined area of the environment, or more generally throughout the environment. If a population threshold is exceeded, the population manager may instruct the dimensional configurator 410 to generate or activate another instance of the overcrowded area. Likewise, the population manager may monitor parallel dimensions, and instruct the dimensional configurator to collapse two or more parallel dimensions into one, if population density falls below a defined threshold.

A dimensional configurator 410 may generate or activate additional parallel dimensions as needed to accommodate population growth. Essentially, the configurator may generate another instance of a crowded space within a virtual-reality environment by copying an existing space or template. In the alternative, different avatar populations may share common elements defining the envelope of a modeled space. Elements of modeled spaces may be stored in a dimensional database 412 in operative association with the configurator 410. The configurator may also ensure, in cooperation with the avatar manager 406, that each dimension is correctly populated with avatars. The configurator 410 may also operate to collapse empty or sparsely populated ones of parallel dimensions. For example, the configurator may move remaining avatars to another dimension and inactivate or delete the emptied dimension.

A communications module 416 may operate more or less independently of other components to enable communication, such as chat, between different users. In an embodiment of the invention, chat operates independently of animation. In the alternative, a chat process may be coordinated with avatar animation. For example, an avatars lips may move in sync with audio chat. In either embodiments, the communications module may allow users to chat with other users corresponding to nearby avatars. In addition, the communications module may permit users to place a chat "telephone call" to any user logged into the system, regardless of the relative locations of the users' avatars.

An animation component 414 may operate to process user commands, dimensional data and other model data to produce simulations of all active parallel spaces and other active regions of the modeled environment. Generally, a space or region may be considered active if it is within sight of a user-selected viewpoint. Various methods are known for simulating avatars and objects within modeled spaces, and any suitable method may be used. In addition, it is anticipated that new method may be developed that may also be suitable. In general, any method that is suitable for modeling non-parallel, regular region of modeled space should be readily adaptable to modeling parallel dimensions.

The animator 414 may produce raw model data that is not configured for efficient distribution to remote clients. Accordingly, the animator may cooperate with an output control module 420 to prepare the output data 404 for distribution to remote clients. This may include translation or transformation of the animated model data from the animator to a format that is suitable for distribution to system clients. The form of translation or transformation will depend on the application software used at the client level and other details that should be apparent to one of ordinary skill.

Figure 5:
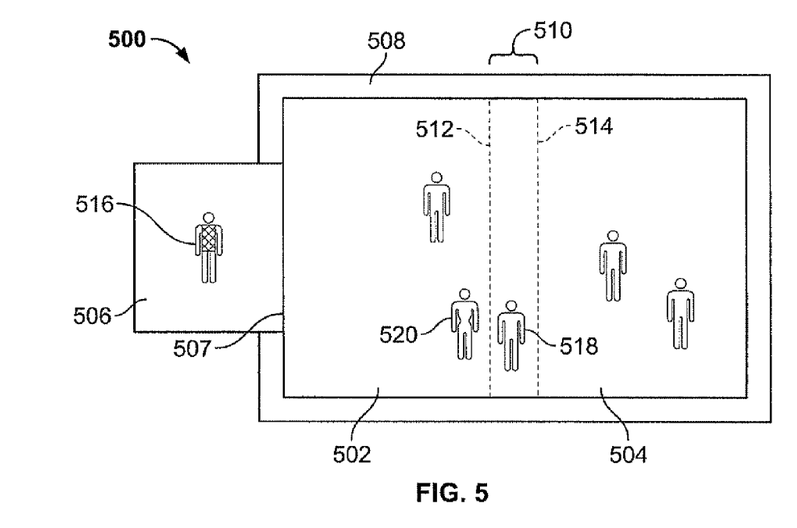
FIG. 5 is a schematic diagram showing aspects of a method for managing multiple dimensions according to the inventions.

In another preferred embodiment, various ones of the dimensions may overlap, for example, to prevent users from experiencing an overly empty dimension. Such overlap may be geographical (i.e. areas within a virtual "club" or other environment), overlap between users grouped into dimensions, or otherwise. Referring to FIG. 5, an exemplary multidimensional system 500 is shown schematically, as it might be represented in a system memory. System 500 may comprise a first dimension 502 adjacent to a second dimension 504, representing, for example, areas of a virtual nightclub. The first dimension may be connected to a common space 506 via a transparent interface 507. The common space may represent, for example, a stage area. The first and second dimensions may be demarcated by a pair of interfaces 512, 514 that define an overlapping region 510 belonging to both dimensions 502, 504. Interfaces 512, 514 may also be transparent, so that all parts of the system 500 interior are potentially visible from viewpoint in any one of areas 502, 504 and 506. The parallel dimensions 502, 504 may also be enclosed by a common wall. In general, avatars within the parallel dimensions 502, 504 may not be able to pass through the interfaces 507, 512 and 514. In an embodiment of the invention, however, passing through one of the interfaces 512 and 514 may trigger a reassignment to another dimension designed maintain the user within an assigned group of avatars.

With reference still to FIG. 5, one implementation of this embodiment may be to create four instances of a nightclub, with four different audiences (A, B, C, and D), as shown in Table 1 below.

TABLE 1

| Instance Number | Audience Area 1 | Audience Area 2 |
|---|---|---|
| 1 | Group A | Group B |
| 2 | Group C | Group D |
| 3 | Group D | Group A |
| 4 | Group B | Group C |

The nightclub appears to be fully contiguous to all avatars in every instance, but the population of Areas 1 and 2 (corresponding to spaces 502, 504, respectively) depends on which instance and audience area an avatar is located in. Thus, for example, in Instance Number 1, Audience Area 1, an avatar looking into Audience Area 2 may see Group B. However, when the avatar moves into Audience Area 2, it may be automatically transitioned to Instance 3. Therefore, from the viewpoint of this avatar when looking back toward the stage, Group D is seen within Audience Area 1, and the avatar remains in Group A, albeit on the other side of the group.

Boundaries between the two Audience Areas, and between Audience Area 1 and the stage, may be referred to as an "interface". The interfaces may be sharp, with no overlap, or there may be areas within the interface where multiple instances of the universe may exist simultaneously. Similarly, communication (visual, audio, chat, or otherwise), may be implemented across interfaces potentially limited by proximity of users to the interface. For example, an avatar 518 present in region 510 may be able to chat with avatar 520 in Audience Area 1, even if the avatar 518 belongs to a different group than present in Area 1.

The common dimension 506, or the stage area in the diagram above, may be created in a manner in which the performer 516 will be visible to all users in all instance numbers. Some audience groups, or members, may be permitted to interact with the performers and may be selected by any of a number of criteria, including without limitation paid members, early arrivals, random selection, etc. The performers may optionally see only one or more groups of users, may see all users even if shown via different computers, screens or windows or by representative methods such as statistics, applause meters, etc. The audiences from multiple dimensions may also be rendered translucently and overlain on each other, so as to make additional members visible to the performers.

In embodiments of the inventions, multiple end users may be merged into the same avatar with or without the ability to share control of the avatar. For shared control, the control inputs of multiple users may be aggregated in order to generate activity, or may be granted in a round robin or other manner. One example of this would be to permit people in multiple dimensions at a nightclub to get into the "stage diving" line, and then inhabit a single avatar which is then permitted to enter the "performer" dimension, be seen by all users, and then jump off the stage, disaggregate, and land, each user into his own dimension. Further examples of multiuser animations of one or more avatars may be found in provisional Application No. 60/871,446, filed Dec. 21, 2006, which application is incorporated herein by reference.

Figure 6:
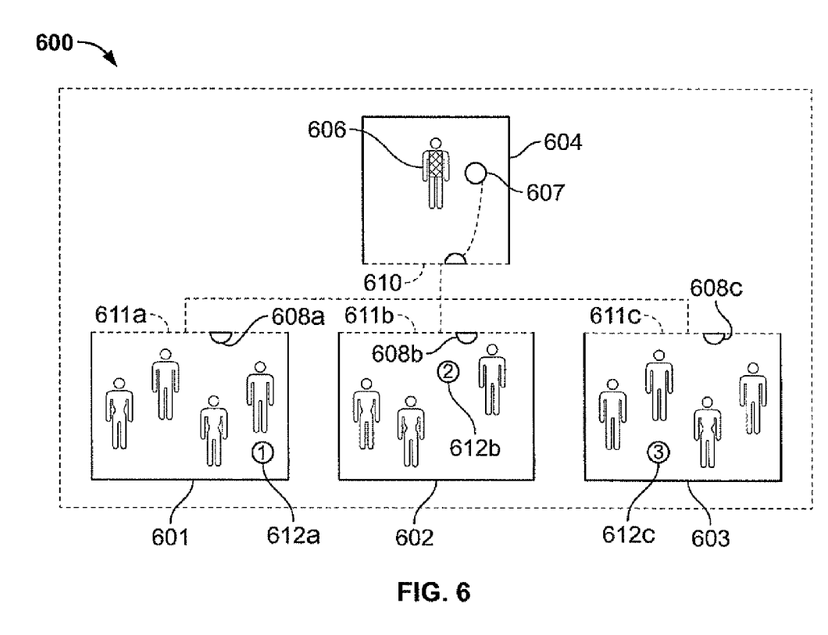
FIG. 6 is a block diagram showing aspects of managing an interface between multiple dimensions according to the inventions.

Objects moving from a common dimension may optionally automatically replicate when crossing an interface into a parallel dimension so as to replicate into multiple instances of themselves. FIG. 6 is a diagram showing an exemplary system 600 comprising a common dimension 604 linked to parallel dimensions 601, 602, and 603. In embodiments of the inventions, such replication may place a copy of the item into each dimension or instance of linked to the common dimension. The item may then be independently manipulated and utilized within each dimension or instance. Optionally, the items may be marked, numbered, or tracked by the dimension into which they first were replicated. For example, a performer avatar 606 may throw a ball 607 towards interface 610. As the ball penetrates the interface, it may be subtracted from common space 604 and appear as separate independent instances 608a-c in parallel dimensions 601, 602 and 603 respectively. Essentially, any number of new objects may be generated in this manner. After penetrating fully past the respective interfaces 611a-c, the newly-generated balls may exist as new objects 612a-c, respectively.

Figure 7A:
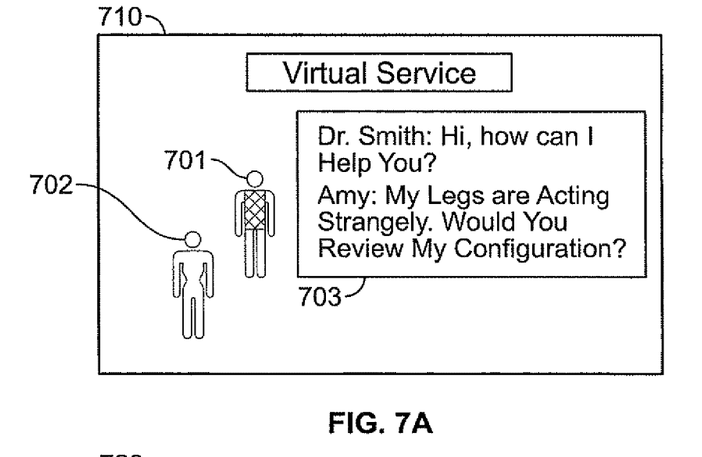
FIGS. 7A-C are exemplary simplified screenshots of user displays according to the inventions.
Figure 7B:
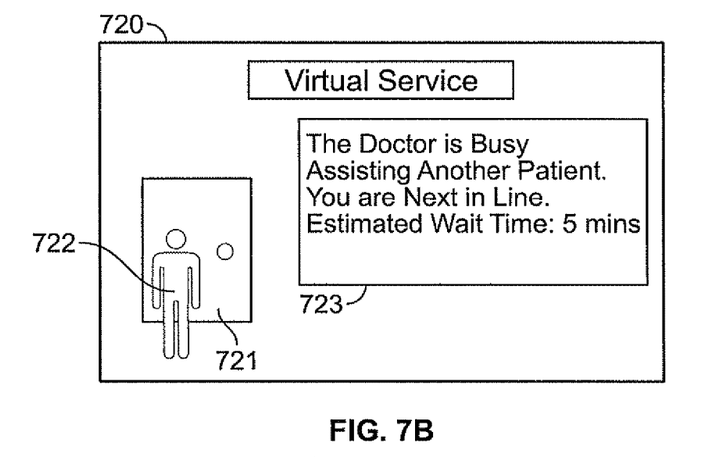
Figure 7C:
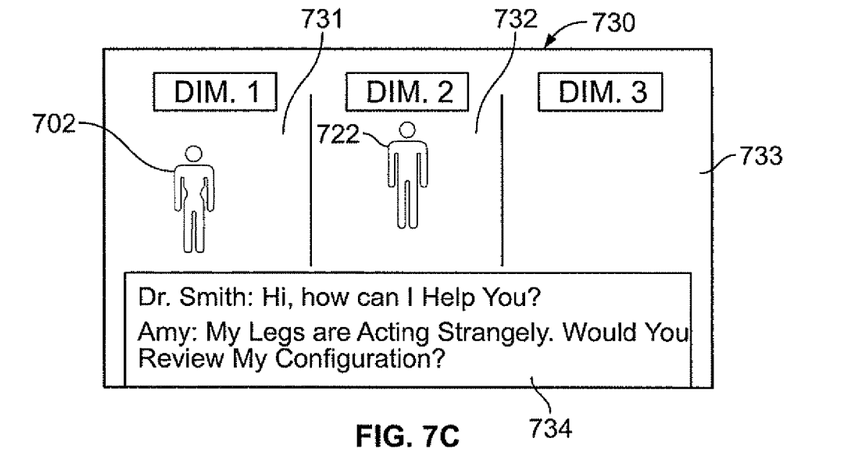

Common areas linked to multiple dimensions may also be useful for commercial use, for example, the provisions of services or virtual products. Some such application may involve the personal attention of a merchant or service provider. Such a user may desire to be marketed in all linked parallel dimensions, but cannot simultaneously serve users in different dimensions. For such applications, it may be desirable to manage the interface between the common area and the parallel dimensions to permit both pan-dimensional presence for the merchant or service provider, and personal service for each customer. FIGS. 7A-C are simplified screenshots exemplifying an implementation of an exemplary method for accomplishing this objective.

FIG. 7A shows a screenshot 710 representing system output data such as may be provided to a first user having an avatar 702 in a first parallel dimension visiting an avatar doctor 701 located in a common dimension. A client computer belonging to the first user may take the output data and render a display such as shown. The first user may see an animation of her own avatar 702 conversing with the doctor 701. A chat window 703 may comprise chat text of a conversation between the doctor and the first user. Other objects, for example virtual wares if the user of the common dimension is a merchant of such wares, may optionally be shown to the first user.

FIG. 7B shows a screenshot 720 similarly representing data provided to a second user operating an avatar 722 located in a second parallel dimension. This user may see an animation indicating that the doctor is busy with another patient. For example, a view of a closed door 721 may be presented. Alternative presentations may include, for example, a robot avatar receptionist for the doctor. Optionally, a message box 723 may be provided explaining the status of the doctor, the second user's place in the doctor's queue, an estimated wait time, or any other desired information, including but not limited to advertising.

FIG. 7C shows an exemplary screenshot 730 similarly representing data that may be provided to a user of the common dimension. Such a user may be presented with views of all linked parallel dimensions. The illustrated example shows tiled views, but any other arrangement, for example overlays or successive views, may also be used. In this example, the doctor sees the active patient 702 and a view 731 of the first dimension where the active patient resides. A chat window 734 showing the active conversation may also be displayed. The doctor may also see a view 732 of the second dimension showing the patient 722 waiting there. In this example, a view 733 of a third dimension is provided showing no patients waiting in that dimension. In the alternative, views of dimensions with no waiting patients may be omitted. Any number of parallel dimensions may thus be made visible to a user operating in a common dimension.

Figure 8:
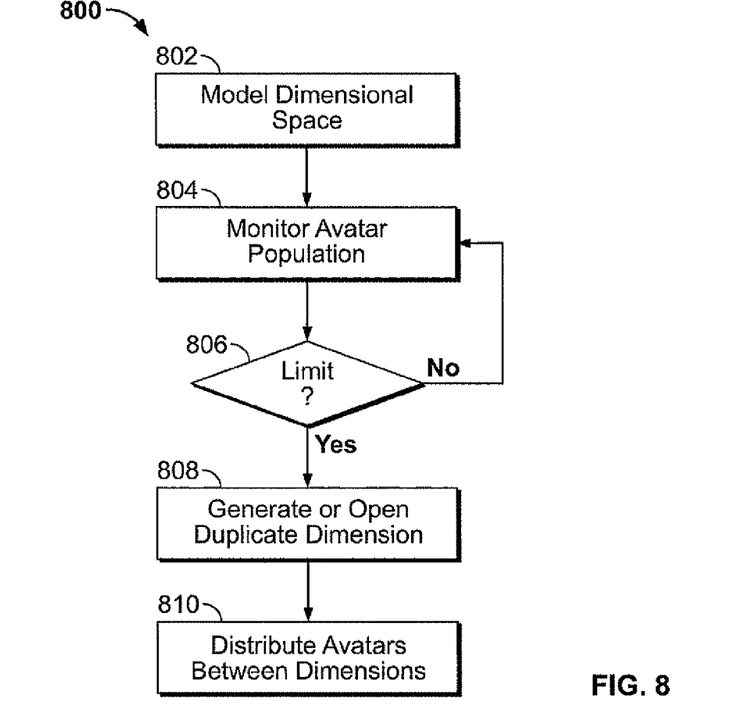
FIGS. 8-10 are flow diagrams showing exemplary steps of methods according to the inventions.

According to the foregoing, therefore, parallel dimensions may be implemented in a computer platform using programming steps that should be apparent to one of ordinary skill in view of the present disclosure. FIG. 8 shows exemplary steps of a method 800 for managing multi-instance, multi-user animation platforms, such as may be implemented in a VRU environment.

Step 802 may comprise modeling a plurality of parallel dimensions in a computer memory. Computer modeling of three-dimensional spaces is known in the art. Such models may conform to rules that mimic the physical environment on earth, or may use modified rules to simulate other environments. Any suitable model and method of modeling may be used. As used herein, a "parallel dimension" means a duplicate or recognizable counterpart of a bounded, computer-modeled space that is accessible via a common environment. Parallel dimensions may be created, for example, by copying element of an existing space or template for a space in the computer memory. Each of the plurality of parallel dimensions may comprise an independent model of a physical, three-dimensional space having corresponding features such that the parallel dimensions are recognizable as counterparts to each other. It is not necessary that each dimension be an exact duplicate of other dimensions. Because the dimensions operate independently, some divergence may occur after the dimensions become active. For example, a piece of furniture that is initially positioned identically in counterpart dimensions may be moved.

The parallel dimensions may have the characteristic of operating concurrently in a system memory. While certain activities inside each parallel dimension may be independent, for example, the activity of avatars, nonetheless the parallel dimensions may retain some relationships to one another. For example, the parallel dimensions may share common spaces or portals to common spaces. For further example, communication between avatars in different dimensions may be permitted. Avatars may also be permitted to travel between dimensions.

One important inter-dimensional relationship may comprise inter-dimensional population control. The VRU system may comprise, for example, a VRU module that operates to monitor the population of certain spaces within the VRU to ensure that they do not become too crowded with avatars, as indicated at step 804. Besides ensuring that additional dimensions are generated or activated as needed to relieve overcrowding, the VRU system may operate to distribute avatars between parallel dimensions. For example, step 804 may comprise locating or assigning avatars within corresponding ones of parallel dimensions so as to prevent over-population of any one of the parallel dimensions by avatars. To perform this step, the VRU engine or module may compare a present avatar population, population density, and/or rate of change of the foregoing, to criteria established for the space in question. For example, an optimal avatar density for a nightclub floor may be in the range of 1-4 avatars per square meter of simulated space, while for a simulated park the optimal density may be 0.2-1 avatars per square meter.

As the population of a space approaches or exceeds a defined limitation, as indicated at steps 808 and 808, the VRU system may generate or activate a parallel dimension that replicates the overcrowded dimension. In an embodiment of the invention, multiple parallel dimensions may operate simultaneously. If, for example, just one of these dimensions becomes overcrowded, the overcrowding may be resolved by transferring avatars to less crowded dimensions, as indicated at step 810. If no less crowded dimensions are available, a new dimension may be generated and/or activated. In an embodiment of the invention, a new parallel dimension may be generated by copying certain elements of an existing space, or by copying a template for an existing space that is reserved in memory for the purpose of generating parallel dimensions when needed.

Parallel dimensions may also be collapsed into fewer dimensions as avatar populations decline. For example, if an average population density across multiple dimensions falls below a defined threshold, any empty dimensions may be shut down. The process of shutting down a dimension may include erasing the dimension from the computer memory used to model the computer environment. In an embodiment of the invention, the closed dimension may be archived or reserved for future use, optionally for a limited period of time. If it is desired to shut down a dimension that is not empty of avatars, avatars present in the dimension may be transported to an adjacent parallel dimension. Before shutting down a dimension, the system may inform users corresponding to any avatars in the dimension. Such users may be given the option of transporting to a parallel dimension or elsewhere in the VRU environment. If a user does not select an alternative destination, the VRU system may choose for her. Advantageously, shutting down under-populated dimensions may conserve system resources and prevent users from encountering under-populated environments.

As indicated at step 810, avatars may be distributed between related parallel dimensions according to various schemes. Method 800 may further comprise relocating an avatar from a first one of the parallel dimensions to a second one of the parallel dimensions. Relocation may be accomplished by any desired method of transporting avatars within a VRU environment. For example, an avatar may walk through a door to another space or be "teleported" to another space in the environment. An avatar may be relocated from a first one of the parallel dimensions to a second one of the parallel dimensions (or to any other location in the environment) in response to user input signifying a request to relocate the avatar. In the alternative, relocation may be performed without user input. For example, an avatar may be relocated between parallel dimensions or out of a parallel dimension when a population of avatars in one or more of the parallel dimensions reaches a predetermined limit. One or more avatars may be automatically relocated from crowded ones of the parallel dimensions into an additional parallel dimension that is generated or activated to accommodate avatar population growth.

Figure 9:
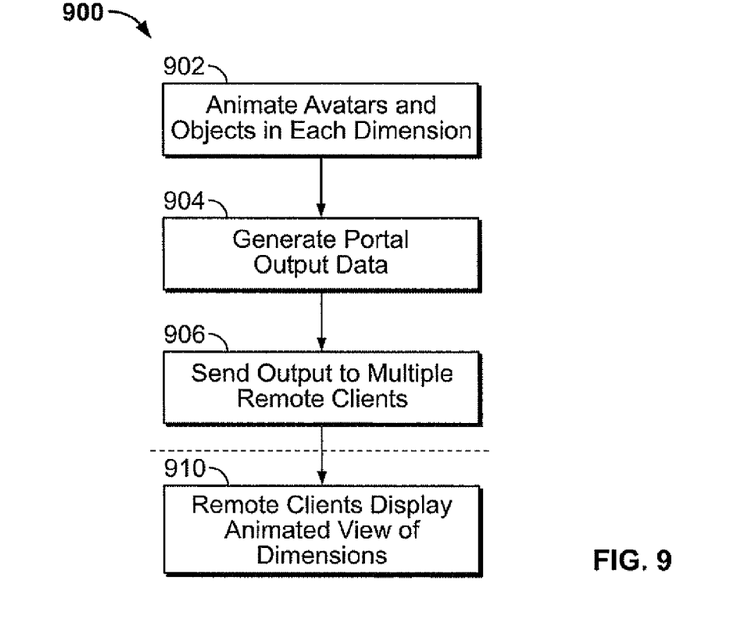

Whatever the number of dimensions operable within an environment, a VRU system should operate to independently animate ones of the plurality of avatars within different ones of the parallel dimensions, using input from respective corresponding ones of users. "Animate," in this sense, essentially means to process user input data, rules of the modeled environment, modeled properties of objects in the environment, or other data to calculate the positions and/or shape of objects in the environment at successive instants of modeled time. Such an animation process may be encompassed in what is generally as "computer simulation." FIG. 9 shows exemplary steps of a method 900 for animating a VRU environment and objects therein. It should be appreciated that method 900 may be operated concurrently with method 800 to manage a multi-user, multi-dimensional animation process and provide a plurality of users with desired output data.

At step 902, the VRU engine may animate avatars and objects in each dimension. Avatars and objects may be modeled in any desired manner. In an embodiment of the invention, avatars may be modeled as jointed figures covered by a skin. Objects may interact with one another via "contact" that occurs when modeled objects attempt to occupy the same volume of modeled space. Various physical attributes, such as, for example, mass, momentum, muscle & skeletal limitations, and so forth, may be associated with the modeled objects to impart greater realism to the simulation. In embodiments of the inventions, physical rules may be modeled so as to permit activities that cannot occur in the real world, such as, for example, winged flight by humans. In general, various computer modeling methods are known in the art to simulate motion of objects and figures in modeled space, and any suitable method may be used to simulate motion of avatars and other objects.

Animation of objects in parallel dimensions may generally proceed independently of each other. For example, a first avatar in a first dimension should not be able to contact or be visible to a second avatar in a second dimension. Avatars may be able to chat across dimensions, which may be conducted as a separate process apart from animation. Objects and avatars in a common dimension may be modeled together with each parallel dimension. For example, if "c" represents the model of the common space and "p" represents the model of the parallel space, the animation for each parallel space "$p_i$" may comprise "$p_i+c$."

At step 906, portal output data may be generated for a plurality of remote clients. A system module, e.g., a portal module, may separate and direct data from multiple animation streams so that the correct data is provided to each client in the correct format and sequence. Each client should receive sufficient data to generate a view of the environment as seen through the virtual eyes of his or her avatar, or as seen from another viewpoint near the avatar. The view should include at least nearby avatars and objects. More distant objects may also be visible, optionally at diminishing resolution with increasing distance from the viewpoint. In general, the identification of a viewpoint associated with each user may make it possible to reduce the amount of information sent to each user, as more distant information need not be provided.

As an output of the animation process, virtual-reality data may be provided to each of the plurality of users, as indicated at step 906. Various methods are known in the art for providing data to clients, and any suitable method may be used. A connection may be made to one or more communication ports of client computers running an application for receiving data and transforming it as necessary for a visual display. The virtual-reality data may be configured to cause remote clients of each of the users to output an animated display of a corresponding one of the parallel dimensions and avatars therein, as indicated at step 910. For example, a first user corresponding to an avatar located in parallel dimension 'A' may receive virtual-reality data for viewing objects and other avatars inside of dimension 'A', while a second user controlling an avatar located in parallel dimension 'B' may receive data for displaying the interior of dimension 'B.' Both users may receive data for viewing a common dimension 'C' linked to dimensions 'A' and 'B,' if present.

As previously noted, a common space may be modeled in the computer memory, configured in relation to multiple parallel dimensions so that an interior of the common space is visible from viewpoints located inside each of the parallel dimensions. In an embodiment of the invention, the common space may be modeled so that information concerning each of the parallel dimensions is provided to a user operating an avatar in the common space, or otherwise assigned a viewpoint located in the common space. Such information may be provided, for example, as interior views of each of the plurality of dimensions.

Figure 10:
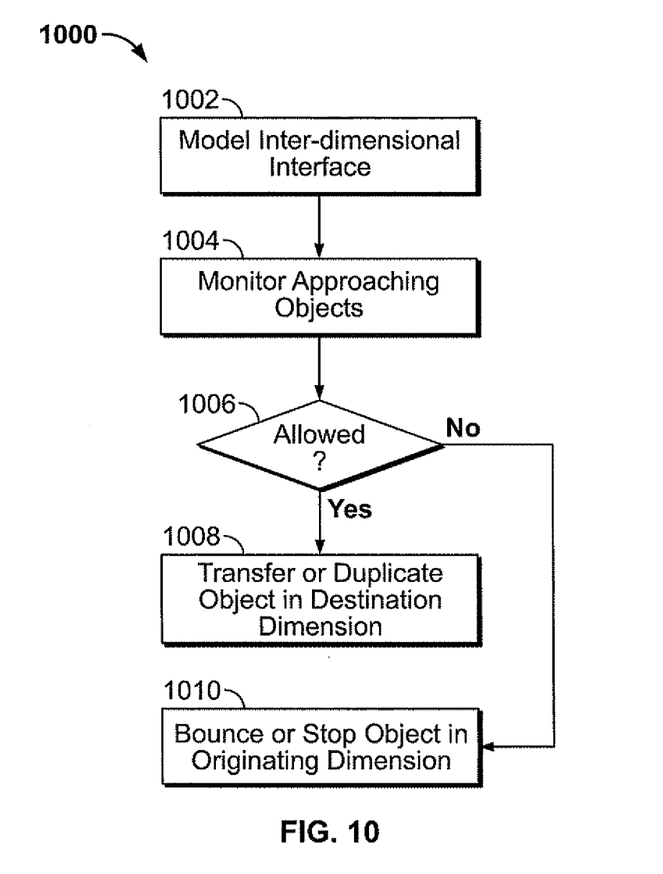

In embodiments of the inventions, it may be desirable to model a common space in a computer memory, configured in relation to multiple parallel dimensions so that a modeled object originating from the common space is capable of passing into at least one of the parallel dimensions, or vice-versa. FIG. 10 shows exemplary steps of a method 1000 for managing an interface between a common space and a parallel space. At step 1002, an inter-dimensional interface may be defined between the common space and two or more parallel spaces, or between adjacent parallel spaces. For example, a surface may be defined as a boundary between the common space and each of the parallel spaces. Such surfaces may be contoured to fit one another. That is, an interface surface dividing the common space from multiple parallel dimensions may be contoured to fit each of the surfaces that divide each of the parallel dimensions from the common space. An interface may be modeled to include an overlapping region interactive with both adjacent ones of the plurality of dimensions, or without an overlapping region.

In an embodiment of the invention, an interface may be modeled as a transparent object. Therefore, the common space may be visible to each of multiple parallel dimensions, for example as a stage, storefront, or entry area. Likewise, multiple parallel dimensions may be visible from the common space, either overlain on each other, tiled, presented in sequence, or in some other arrangement. If multiple parallel dimensions are arranged around a common space, providing a transparent interface around the common space may render adjacent ones of the paralle dimensions visible to each other. In the alternative, an interface may be modeled as a translucent or opaque object.

At step 1004, the interface may be monitored for approaching objects. When an object touches or approaches the interface, the system may determine the interface properties of the object, as shown at step 1006. For example, the system may consult a properties table associated with the object to determine whether or not the object has the capability of passing through the interface. The simulation may then proceed differently, depending on the properties of the object. If the object is allowed to "pass" through the interface, an object passing from the common space into multiple parallel dimensions may be replicated as it passes through the interface, as indicated at step 1008. The replicated objects may then be animated synchronously (as in the case of an avatar controlled by a single user), or asynchronously (as in the case of a passive object) in each of the parallel dimensions.

In an embodiment of the inventions, a common space in the computer memory may be configured in relation to multiple parallel dimensions so that an avatar originating from the common space is capable of passing into one of the parallel dimensions. This is a special case that may be used to populate multiple dimensions with avatars originating from a common space, for example a space modeled as a public road or hallway. In this embodiment, one of the parallel dimensions is selected as the destination for the object. Selection may be accomplished using various criteria. In an embodiment of the invention, selection may be based on avatar populations of each parallel space. For example, an avatar may be directed to a dimension having the lowest population, or any other desired population criteria. In the alternative, or in addition, selection may be based on a corresponding user preference. For example, a user may indicate a preference for a dimension populated by other French-speaking avatars.

In addition, a common space in the computer memory may be configured in relation to the plurality of parallel dimensions so that an avatar originating from any one of multiple parallel dimensions is capable of passing into the common space. An object passing from a parallel space into a common space may be subtracted from the parallel space and added to the common space as it passes through the interface. This may be used as a way for avatars to leave a parallel dimension and to re-enter non-parallel portions of the modeled environment.

If the object is not allowed to pass through the interface, the object may be bounced from the interface, or stopped short of the interface, as indicated at step 1010. The object therefore cannot leave the dimension of origin through that particular interface. Of course, because the dimension is part of a larger modeled environment, it should contain at least one other doorway or other transportation element that allows objects to leave the dimension and enter other portions of the modeled environment.

According to the foregoing, therefore, implementations of parallel dimensions may require the creation and tracking of at least three different categories of items. The first category may include items such as walls that are non-manipulable and are identical in all dimensions. The walls may in fact exist only in a single dimension, which is shared via an interface with all other dimensions, in this manner minimizing the number of items that servers and clients must track. The second category may include items existing in a single dimension only, such as avatars. The third category may include items created identically in all dimensions but that become independent of each other once created. This third category may be exemplified by furniture and the like.

When a dimension is generated or activated, it may be populated with standardized furniture or other objects belonging to the third category. Such furniture, while potentially identical when created, and created simultaneously in multiple dimensions, may be manipulable, destructible, and otherwise alterable within each dimension independently. Movable replicated objects, for example, furniture and the like, existing in parallel dimensions may tend to migrate to different locations over time, as each instance of the dimension may be modeled separately. This may lead to divergence between otherwise parallel dimensions that may make travel or other interactions between parallel dimensions disorienting for those who experience them. At the same time, it may not be desirable to make such objects unmovable or unchangeable.

Therefore, it may be desirable to return certain movable objects back to a home position when displaced. In an embodiment of the invention, therefore, analogous objects may be tracked in different ones of parallel dimensions. Any ones of the analogous objects that become displaced from a home position may be moved back towards the home position, so that positions of analogous objects within each of the parallel dimension tend to converge on the home position over time. For example, a chair may be moved by an avatar in one of the dimensions. However, in related parallel dimensions, the chair is unmoved. A system component may cause the moved chair to slowly, potentially over the course of hours, to move back to the position of the chair in the adjoining dimensions. Return movement may be executed relatively slowly so that it is not noticeable to nearby avatars. Speed of return movement may depend, therefore, on the relative proximity of nearest avatars. For further example, if a glass is dropped within a dimension, the server may cause it to fall and roll in the direction of the corresponding glass in a neighboring dimension. In this manner, the dimensions would continue to resemble each other over time, making travel between the dimensions less disorienting for the persons manipulating the avatars.

In general, a VRU environment may provide communication tools for users to communicate with one another in real time. For example, a typical environment may include a text chat or audio chat feature. In general, it may be desirable to not disable such communication features for users associated with avatars located in different parallel dimensions. In other words, although parallel dimensions may be animated separately, they are still part of the same environment and may still make use of the same communication tools. In an embodiment of the invention, therefore, a communication channel may be provided between avatars in different ones of the plurality of dimensions.

Having thus described embodiments of method and system for a multi-user, multi-dimensional animation, it should be apparent to those skilled in the art that certain advantages of the within system have been achieved. It should also be appreciated that various modifications, adaptations, and alternative embodiments thereof may be made within the scope and spirit of the present invention. For example, a method implemented over a public network such as the Internet has been illustrated, but the inventive concepts described above would be equally applicable to implementations over other networks. The invention is defined by the following claims.

The invention claimed is:

1. A method, comprising:
   modeling, in a computer memory, multiple parallel instances of a multi-dimensional virtual reality space, each of the plurality of parallel instances replicating the multi-dimensional virtual reality space;
   assigning ones of a plurality of modeled multi-dimensional avatars within the computer memory so that each of the plurality of avatars populates a respective one of the parallel instances and each of the plurality of parallel instances is populated by a unique subset of the plurality of avatars, wherein the assigning limits a total number of the plurality of avatars in each of the unique subsets; and
   modeling a common space in the computer memory configured in relation to the plurality of parallel instances so that at least one object located inside the common space is visible from viewpoints located inside each of the plurality of parallel instances.

2. The method of claim 1, further comprising animating at least one avatar populating the common space in response to user input.

3. The method of claim 1, further comprising modeling the common space in the computer memory configured in relation to the plurality of parallel instances so that an avatar originating from the common space is capable of passing into a selected one of the plurality of parallel instances.

4. The method of claim 1, further comprising selecting which one of the plurality of parallel instances an avatar is capable of passing into based at least in part on a total number of the plurality of avatars populating each of the plurality of parallel instances.

5. The method of claim 1, further comprising tracking analogous objects in different ones of the parallel instances and moving any displaced ones of the analogous objects so that positions of analogous objects within each of the parallel instance tend to converge over time.

6. The method of claim 1, further comprising modeling an interface space between at least two adjacent ones of the plurality of parallel instances including an overlapping region that is interactive with the at least two adjacent ones of the plurality of parallel instances.

7. The method of claim 1, further comprising relocating an avatar from a first one of the parallel instances to a second one of the parallel instances in response to determining that a number of avatars in the first one of the parallel instances has reached a predetermined limit.

8. The method of claim 1, further comprising providing a communication channel between avatars populating different ones of the plurality of parallel instances.

9. A non-transitory computer-readable medium encoded with instructions, that when executed by a computer, cause the computer perform operations including:
modeling, in a computer memory, multiple parallel instances of a multi-dimensional virtual reality space, each of the plurality of parallel instances replicating the multi-dimensional virtual reality space;
assigning ones of a plurality of modeled multi-dimensional avatars within the computer memory so that each of the plurality of avatars populates a respective one of the parallel instances and each of the plurality of parallel instances is populated by a unique subset of the plurality of avatars, wherein the assigning limits a total number of the plurality of avatars in each of the unique subsets; and
modeling a common space in the computer memory configured in relation to the plurality of parallel instances so that at least one object located inside the common space is visible from viewpoints located inside each of the plurality of parallel instances.

10. An apparatus comprising a computer processor coupled to a memory holding instructions, that when executed by the computer processor, cause the apparatus perform operations including:
modeling, in a computer memory, multiple parallel instances of a multi-dimensional virtual reality space, each of the plurality of parallel instances replicating the multi-dimensional virtual reality space;
assigning ones of a plurality of modeled multi-dimensional avatars within the computer memory so that each of the plurality of avatars populates a respective one of the parallel instances and each of the plurality of parallel instances is populated by a unique subset of the plurality of avatars, wherein the assigning limits a total number of the plurality of avatars in each of the unique subsets; and
modeling a common space in the computer memory configured in relation to the plurality of parallel instances so that at least one object located inside the common space is visible from viewpoints located inside each of the plurality of parallel instances.

11. The apparatus of claim 10, wherein the memory holds further instructions for animating at least one avatar populating the common space in response to user input.

12. The apparatus of claim 10, wherein the memory holds further instructions for modeling the common space in the computer memory configured in relation to the plurality of parallel instances so that a modeled object originating from the common space is capable of passing into at least a portion of each of the plurality of parallel instances.

13. The apparatus of claim 12, wherein the memory holds further instructions for replicating the modeled object passing into the plurality of parallel instances so that a replica of the object is modeled in each of the plurality of parallel instances after the object passes from the common space.

14. The apparatus of claim 10, wherein the memory holds further instructions for modeling the common space in the computer memory configured in relation to the plurality of parallel instances so that an avatar originating from the common space is capable of passing into a selected one of the plurality of parallel instances.

15. The apparatus of claim 14, wherein the memory holds further instructions for selecting which one of the plurality of parallel instances the avatar is capable of passing into based at least in part on a total number of the plurality of avatars populating each of the plurality of parallel instances.

16. The apparatus of claim 14, wherein the memory holds further instructions for selecting which one of the plurality of parallel instances the avatar is capable of passing into based at least in part on a corresponding user preference.

17. The apparatus of claim 10, wherein the memory holds further instructions for tracking analogous objects in different ones of the parallel instances and moving any displaced ones of the analogous objects so that positions of analogous objects within each of the parallel instance tend to converge over time.

18. The apparatus of claim 10, wherein the memory holds further instructions for collapsing at least two of the plurality of parallel instances into a combined instance populated by the avatars formerly in the first and second ones of the plurality of parallel instances.

19. The apparatus of claim 10, wherein the memory holds further instructions for automatically animating an avatar present in multiple ones of the plurality of parallel instances.

20. The apparatus of claim 10, wherein the memory holds further instructions for modeling the common space enabling interaction between the at least one object and a different adjacent one of the plurality of parallel instances based on a position of the at least one object in the common space.

21. The apparatus of claim 10, wherein the memory holds further instructions for providing a communication channel between avatars populating different ones of the plurality of parallel instances.

22. The apparatus of claim 10 wherein the memory holds further instructions for relocating an avatar from a first one of the parallel instances to a second one of the parallel instances.

23. The apparatus of claim 10, wherein the memory holds further instructions for relocating an avatar from a first one of the parallel instances to a second one of the parallel instances in response to user input signifying a request to relocate the avatar.

24. The apparatus of claim 10, wherein the memory holds further instructions for relocating an avatar from a first one of the parallel instances to a second one of the parallel instances in response to determining that a number of avatars in the first one of the parallel instances has reached a predetermined limit.

25. The apparatus of claim 10, wherein the memory holds further instructions for generating an additional parallel instance of the multi-dimensional virtual reality space, and relocating avatars from the plurality of parallel instances into the additional parallel instance.

26. The apparatus of claim 10, wherein the memory holds further instructions for modeling actions of the plurality of avatars populating different ones of the parallel instances in response to input from corresponding ones of client devices to provide virtual-reality data in the computer memory, the virtual-reality data configured to enable the client devices to output an animated display of a corresponding one of the parallel instances and avatars assigned thereto.

\* \* \* \* \*